United States Patent
Bülow

(10) Patent No.: US 6,256,130 B1
(45) Date of Patent: Jul. 3, 2001

(54) METHOD FOR OPTICAL TRANSMISSION OVER A FIBER OPTIC NETWORK, AND OPTICAL COMMUNICATION NETWORK

(75) Inventor: Henning Bülow, Stuttgart (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/143,500

(22) Filed: Aug. 28, 1998

(30) Foreign Application Priority Data

Aug. 28, 1997 (DE) .............................................. 197 37 482

(51) Int. Cl.⁷ .................................................. H04B 10/12
(52) U.S. Cl. ........................ 359/173; 359/180; 359/181; 359/188; 359/189; 359/184; 359/191; 359/192
(58) Field of Search ..................................... 359/173, 180, 359/181, 188, 189, 191, 192, 184

(56) References Cited

U.S. PATENT DOCUMENTS

| | | | |
|---|---|---|---|
| 4,704,715 | 11/1987 | Shibagaki et al. | 370/50 |
| 4,817,206 | 3/1989 | Calvani et al. | 455/616 |
| 4,918,747 | 4/1990 | Bekooij | 455/617 |
| 4,928,318 | * 5/1990 | Ibe et al. | 455/608 |
| 4,980,767 | * 12/1990 | Chao et al. | 358/187 |
| 5,025,487 | 6/1991 | Eichen | 455/618 |
| 5,128,790 | 7/1992 | Heidemann et al. | 359/132 |
| 5,162,937 | 11/1992 | Heidemann et al. | 359/124 |
| 5,181,106 | 1/1993 | Sutherland | 358/86 |
| 5,202,780 | 4/1993 | Fussgänger | 359/125 |
| 5,214,526 | * 5/1993 | Tonomura | 359/184 |
| 5,251,053 | * 10/1993 | Heidemann | 359/145 |
| 5,337,175 | 8/1994 | Ohnsorge et al. | 359/125 |
| 5,355,381 | 10/1994 | Leilabady | 372/28 |
| 5,371,625 | 12/1994 | Wedding et al. | 319/173 |
| 5,432,632 | 7/1995 | Watanabe | 359/191 |
| 5,510,919 | 4/1996 | Wedding | 359/115 |
| 5,640,160 | * 6/1997 | Miwa | 341/53 |
| 5,710,651 | * 1/1998 | Longan, Jr. | 359/145 |
| 5,757,529 | * 5/1998 | Desurvire et al. | 359/179 |
| 5,764,858 | * 6/1998 | Sheu et al. | 395/22 |
| 5,903,376 | * 5/1999 | Hofstetter et al. | 359/181 |
| 5,920,415 | * 7/1999 | Grobe et al. | 359/173 |
| 5,963,567 | * 10/1999 | Veselka et al. | 372/21 |
| 6,034,993 | * 3/2000 | Norrell et al. | 375/232 |
| 6,043,920 | * 3/2000 | Leopold et al. | 359/184 |

FOREIGN PATENT DOCUMENTS

| | | |
|---|---|---|
| 3123448 | 12/1982 | (DE) . |
| 3818392 | 12/1989 | (DE) . |
| 4019224 | 6/1990 | (DE) . |
| 4202863 | 8/1993 | (DE) . |
| 4305418 | 9/1993 | (DE) . |
| 8910031 | 10/1989 | (WO) . |

OTHER PUBLICATIONS

H. Luke, "Signalubertragung: Grundlagen der digitalen und analogen Nachtrichtenubertragungssysteme", Springer–Berlag Berlin–Heidelberg, 1992, pp. 133–136.

(List continued on next page.)

*Primary Examiner*—Leslie Pascal
*Assistant Examiner*—Hanh Phan

(57) ABSTRACT

A method for optical transmission over a fiber optic network and an optical communications network are disclosed. The optical signals in the transmitter consist of a modulated signal and a continuous-wave signal which mix in the receiver. The signal resulting from the mixing is evaluated using correlation filters.

13 Claims, 3 Drawing Sheets

OTHER PUBLICATIONS

"Electrical Signal Processing Techniques in Lang–Haul Fiber–Optic Systems", J. Winters et al, *IEEE Transactions on Communications*, vol. 18, No. 9, Sep. 1990, pp. 1439–1453.

"Optical PSK Synchronous Heterodyne Detection Transmission Experiment Using Fiber Chromatic Dispersion Equalization", N. Takachio et al, *IEEE Photonics Technology Letters*, vol. 4, No. 3, Mar. 1992, pp. 278–280.

"2.4–Gbit/s, 306–km repeaterless transmission by using a directly modulated DFB–LD and dispersion–compensating fiber", M. Kakui et al, *OFC '95 Technical Digest*, pp. 148–149.

"Combining code division multiplexing and coherence multiplexing for private communications in optical fiber multiple access networks", N. Karafolas et al, *Optics Communications 123* (1996) pp. 11–18.

"RACE R2005: Microwave Optical Duplex Antenna Line", J. O'Reilly et al, *IEEE Proceedings–J*, vol. 140, No. 6, Dec. 1993, pp. 385–391.

"High–Speed III–V Semiconductor Intensity Modulators", R. Walker, *IEEE Journal of Quantum Electronics*, vol. 27, No. 3, Mar. 1991, pp. 654–667.

\* cited by examiner

METHOD FOR OPTICAL TRANSMISSION OVER A FIBER OPTIC NETWORK, AND OPTICAL COMMUNICATION NETWORK

BACKGROUND OF THE INVENTION

1. Technical Field

This invention relates to a method for optical transmission over a fiber optic network and to an optical communications network as set forth in the preambles of the respective independent claims.

2. Discussion of Related Art

When optical pulses are transmitted over fiber optic links, chromatic dispersion occurs. If, for example, a single bit is respresented by an optical pulse with a duration of 25 ps, this Gaussian pulse broadens after a 100-km fiber length to approximately 240 ps and, in addition, has a continuously varying frequency. Chromatic dispersion corrupts the data transmitted and limits the optical link lengths. To be able to cover long transmission distances and receive usable signals in the receiver despite the chromatic dispersion, use is made of dispersion-compensating optical elements. From M. Kakui et al, "2.4-Gbit/s, 306-km repeaterless transmission . . . ", OFC'95 Technical Digest, page 148, for example, it is known to use dispersion-compensating fibers to compensate for the chromatic dispersion of the transmission link.

The dispersion-compensating optical elements compress the broadened pulses of the data stream back into the original bit pulses of 25 ps full width at half maximum and make the signal detectable for the subsequent photodiode. The dispersion-compensating elements may be conceived as optical correlation filters which correlate the distorted data bits out of the received data stream.

From N. Takachio et al, "Optical PSK Synchronous Heterodyne Detection . . . ", IEEE Photonics Technology Letters, Vol. 4, No. 3, 1992, page 278, a method is known for detecting optical signals which were degraded by chromatic dispersion on the transmission link. In the receiver, a heterodyne detection method is used. The received optical signal is combined with local oscillator light by a fiber coupler and detected by a balanced detector. A problem with such heterodyne detection is that the optical fields of the local oscillator and the input signal beat together optimally only if they are spatially coherent and have the same polarization. Even minor disturbances of the oscillator frequency and/or data clock deviations, particularly during transmissions at high data rates, result in spurious modulations being superimposed on the signal, which make any further evaluation impossible. The big advantage of heterodyne reception is, however, that both the amplitude and phase of the incoming optical signal are also contained in the photodiode signal. Therefore, distortion due to chromatic dispersion can be eliminated with a linear electrical filter. Thus, even if a dispersive fiber is used for the fiber optical link, the transmission distance can be substantially increased.

SUMMARY OF INVENTION

The method according to the invention, has the advantage that no local oscillator is required in the receiver, but that, by transmitting a continuous-wave light signal in addition to the modulated transmitter signal, two miscible coherent signals are transmitted over the same transmission link which then mix in the photodiode of the receiver without the above-mentioned coherence problems. The polarization and frequency adaptation condition is thus met in a simple manner.

The optical communications network according to the invention has the advantage that the prerequisite for heterodyne detection is created by partial modulation of the laser power, which can be implemented in the transmitter in a simple manner.

Further developments of and improvements in the optical communications network are possible. For example, the continuous-wave signal can be generated simply by partial modulation of the laser power using a modulator following the laser diode.

The signal obtained in the photodiode is advantageously evaluated with a correlation filter matched to the dispersion of the transmission link. In a particularly simple embodiment, the correlation filter is a transversal electronic filter implemented as a tapped delay line.

The optical communications network can be used to advantage for the transmission of signals which are modulated as QAM-coded information. The optical communications network is also ideally suited for the transmission of multilevel signals.

By the transmission method according to the invention, modulated and unmodulated radio-frequency signals (microwave signals, microwave carriers, analog TV signals) can also be transmitted and evaluated in a simple manner.

BRIEF DESCRIPTION OF THE DRAWING

Embodiments of the invention are illustrated in the accompanying drawings and will now be explained in more detail. In the drawings.

DETAILED DESCRIPTION OF PREFERRED EMBODIMENTS

Figure 1:
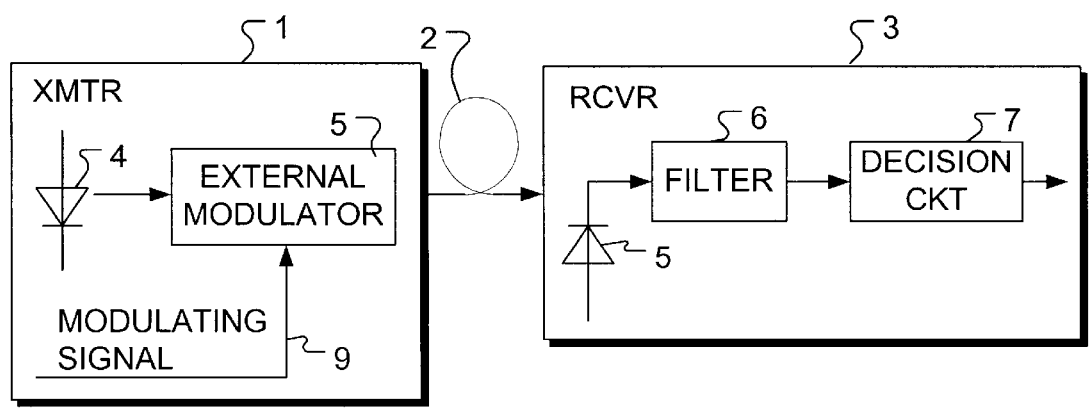
FIG. 1 shows an optical communications network with an external modulator.

FIG. 1 shows an optical communications network consisting of a transmitter 1, a receiver 3, and a fiber-optic link 2 interconnecting the transmitter and receiver. The transmitter 1 includes a laser diode 4 whose light is coupled into an external modulator 5 which is driven by a modulating signal 9 and modulates the light in amplitude or phase. The receiver contains a photodiode 5 followed by a filter 6 and a decision circuit 7. If analog signals are transmitted, the decision circuit 7 can be dispensed with.

Figure 2:
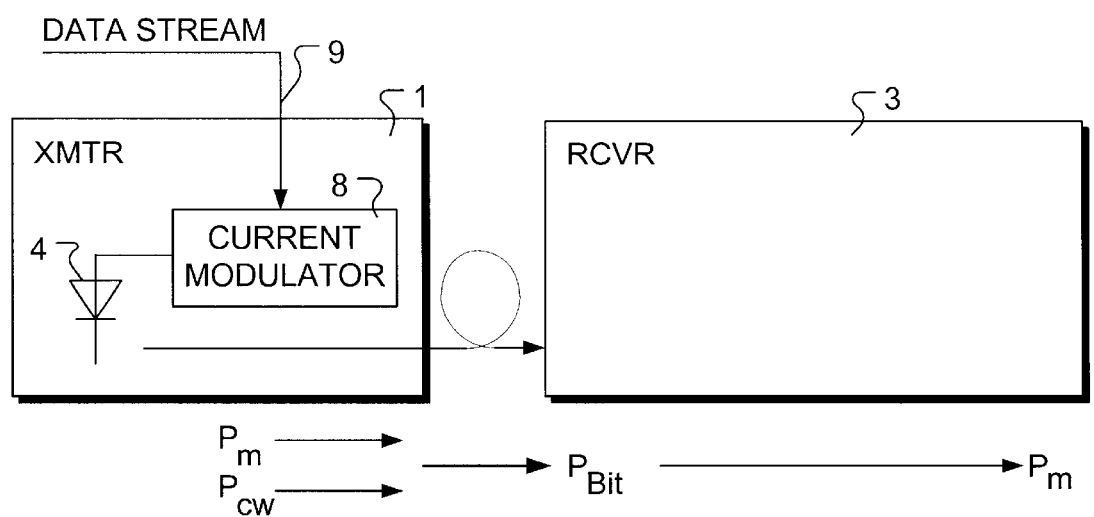
FIG. 2 shows an optical communications network with a laser-diode modulator.

FIG. 2 shows an alternative embodiment in which the current of the laser diode 4 is modulated directly with the data stream 9 by a current modulator 8. From the transmitter 1, the information signal is transmitted as a sum of a modulated signal component $P_m$ and a continuous-wave signal $P_{cw}$. The two signal components mix at the photodiode 5 in the receiver, forming the signal $P_{bit}$. The matched filter 6 and the decision circuit 7 in the receiver evaluate the input signal $P_{bit}$ to recover the modulated signal $P_m$ therefrom and the data stream 9 from the modulated signal.

Figure 3:
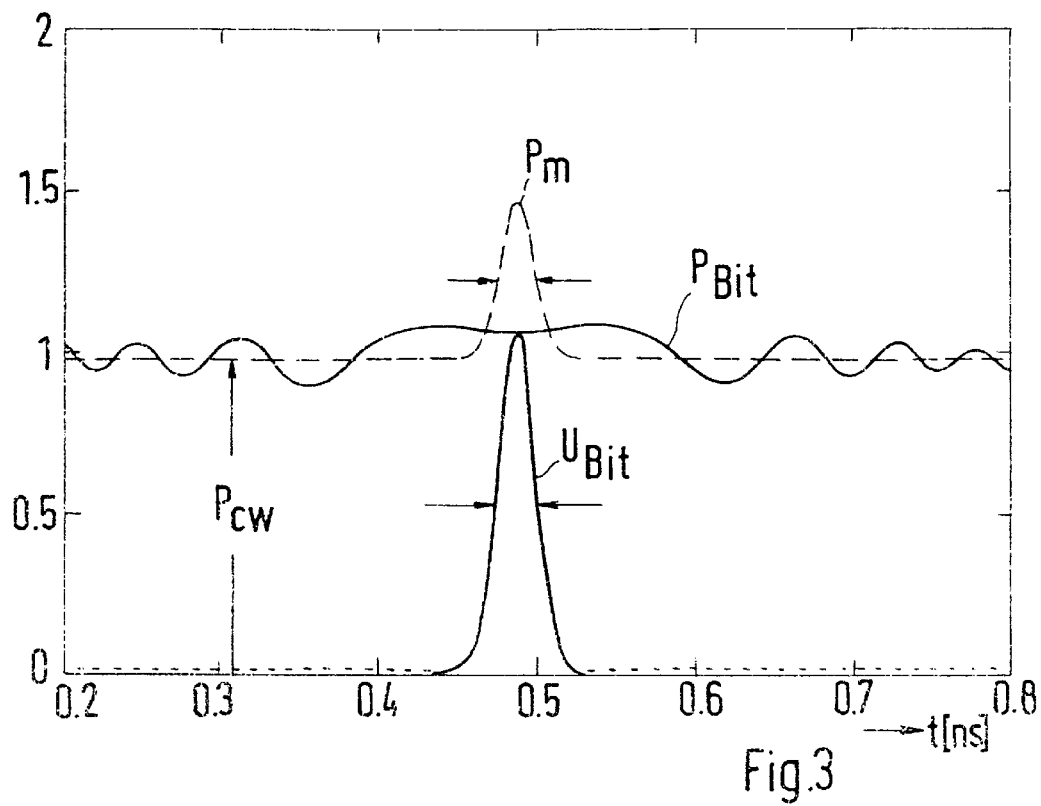
FIG. 3 illustrates the transmission of a single pulse.

FIG. 3 shows the modulated signal $P_m$, with a full width of 25 ps at half maximum, on an offset signal formed by the signal component $P_{cw}$. These two signal components are transmitted over the link 2 and mixed in the photodiode of the receiver to obtain the signal $P_{bit}$. The function of the correlation filter is to correlate the individual electric bit pulses out of the modulated signal $P_{bit}$ and make them available to the subsequent decision circuit. The theoretical background of the design of correlation filters is described, for example, in a textbook by H. D. Lüke, "Signalübertragung: Grundlagen der digitalen und analogen Nachrichtenübertragungssysteme", Springer-Verlag 1992, page 133 et seq. Since the correlation filter is to provide a 25-ps output pulse for a single-bit input signal, namely $U_{bit}$ in FIG. 31 the transfer function of the filter H(f) is given by the quotient of the Fourier transforms of $U_{bit}$ and $P_{bit}$:

$$H(f)=F(U_{bit})/F(P_{bit})$$

Figure 5:
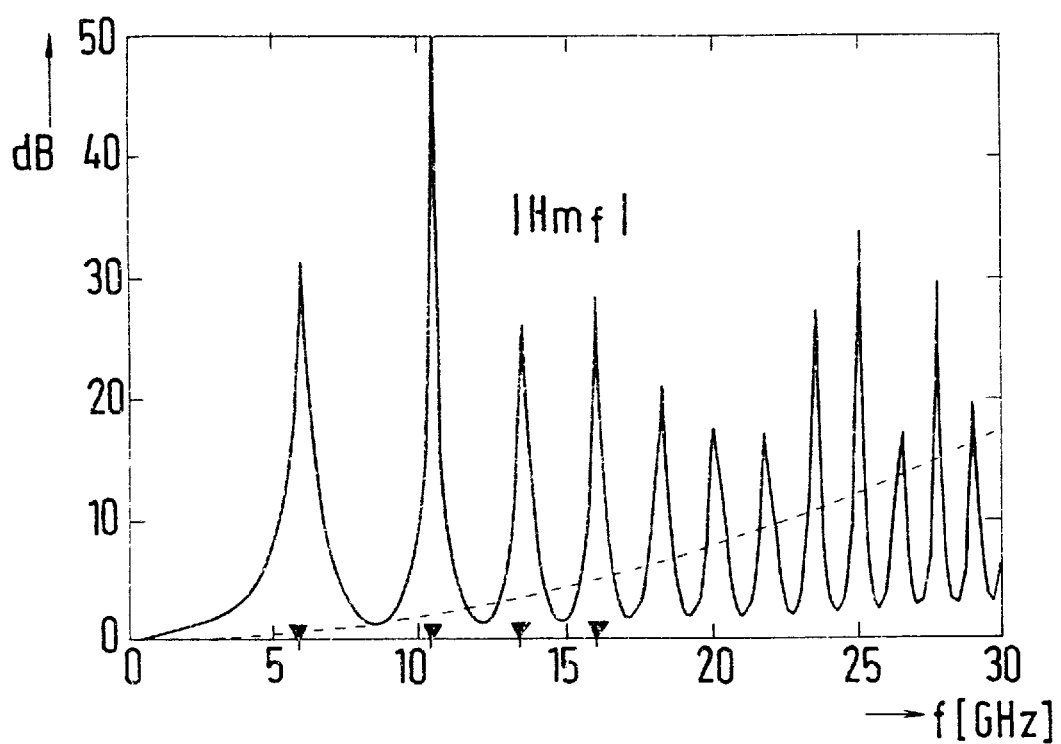
FIG. 5 shows the transfer function of a matched filter.

The function H(f) is shown in the form of a graph in FIG. 5.

Figure 4:
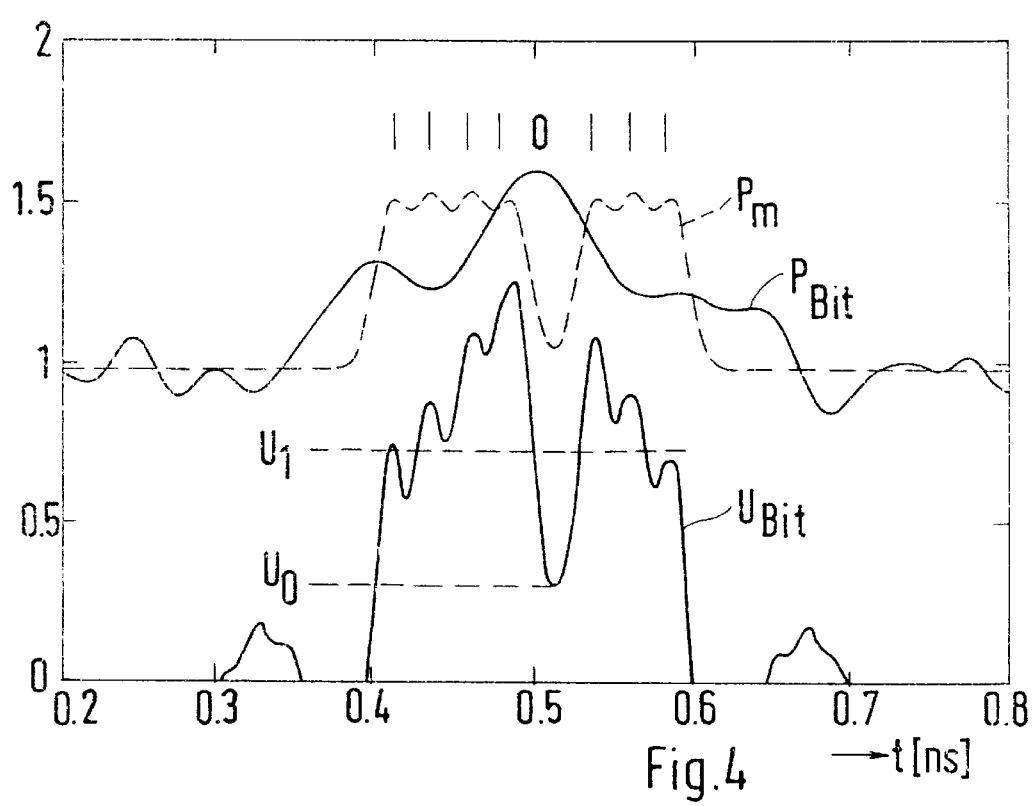
FIG. 4 illustrates the transmission of a signal train.

FIG. 4 illustrates the operation of the correlation filter by the example of a signal sequence 11110111. In the photodiode of the receiver, the signal $P_{bit}$ is formed from the modulated signal $P_m$. The correlation filter 6 correlates the single bits out to obtain the function $U_{bit}$. This function is fed to the decision circuit 7, which decides between the thresholds $U_0$ and $U_1$. It can be seen that with the two threshold values, the function $U_{bit}$ can be evaluated and the originally transmitted signal sequence can be reconstructed. Linear filters used as correlation filters are described, for example, in an article by J. H. Winters, "Electrical Signal Processing Techniques in Long-Haul Fiber-Optic Systems", IEEE Transactions on Communications, Vol. 38, No. 9, 1990, p. 1439. That article deals with the problems associated with the different dispersion effects and proposes different filters for compensating for this form of dispersion. In particular, a tapped delay line implementation of a transversal filter is considered, which is shown in FIG. 2 of the article. By setting different delays and adapting the coefficients to be summed, correlation filters can be implemented which have the desired transfer function. In addition, such filters can be adapted to changes in the transmission link.

The method for recovering the data information using correlation filters and heterodyne detection opens the possibility of using, instead of a simple digital method of modulation, modulation methods with higher bandwidth efficiencies. If the modulation method used is quadrature amplitude modulation (QAM) on a carrier frequency of, e.g., 30 GHz, the bandwidth at a data rate of 80 Gb/s can be reduced to 20 GHz, as compared with 80 GHz with simple digital modulation. The requirements of a good signal-to-noise ratio are met by the heterodyne detection with correlation.

Another advantageous method of modulation is a multilevel modulation of the signal, with different signal amplitudes being assigned to the individual information bits. In that case it is also important that the signal received in the receiver can be unambiguously evaluated. Transmitted signals overlap due to dispersion effects but can be evaluated using heterodyne detection and correlation.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. A method for optical transmission of light over a fiber optic network comprising at least one optical transmitter (1), a fiber optic link (2), and at least one optical receiver (3), the optical transmitter (1) including means (5) for modulating the light in response to a modulating signal (9), and the optical receiver (3) including a photodiode (5) and an electronic filter (6), characterized by generating a continuous wave light signal ($P_{cw}$) and a pulse modulated signal ($P_m$) in the optical transmitter for transmission over said link as two miscible spatially coherent light signals having a same polarization, and by evaluating a signal ($P_{bit}$) resulting from a coherent mixing of the pulse modulated signal ($P_m$) and the continuous-wave light signal ($P_{cw}$) in the optical receiver after transmission over said link for recovering one or more pulses of said pulse modulated signal.

2. An optical communications network comprising at least one optical transmitter (1) and at least one optical receiver (3) interconnected by a fiber optic link (2), the optical transmitter (1) including means (5, 8) for modulating the light in response to a modulating signal (9), and the optical receiver (3) including a photodiode (5) and an electronic filter (6), characterized in that the transmitter (1) includes a current modulator (8) for a laser diode (4) which generates a continuous-wave signal ($P_{cw}$) and a pulse modulated signal component ($P_m$) for transmission over said link as two miscible spatially coherent light signals having a same polarization, and that the receiver (3) includes an evaluating circuit (6) for evaluating a signal resulting from a coherent mixing of the pulse modulated signal component ($P_m$) and the continuous-wave light signal ($P_{cw}$) for recovering one or more pulses of said pulse modulated signal component.

3. An optical communications network as claimed in claim 2, characterized in that in the optical receiver (3), at least one correlation filter (6) and a subsequent decision circuit (7) evaluate the signal resulting from the mixing.

4. An optical communications network as claimed in claim 3, characterized in that the correlation filter (6) is a transversal electronic filter with a matched transfer function.

5. An optical communications network as claimed in claim 3, characterized in that the correlation filter (6) is a tapped delay line.

6. An optical communications network as claimed in claim 2, characterized in that in the transmitter (1), data used in said modulating signal is QAM-coded information.

7. An optical communications network as claimed in claim 2, characterized in that in the transmitter (1), data used in said modulating signal is for modulating according to a multilevel signaling scheme.

8. An optical communications network as claimed in claim 2, characterized in that the modulating signal (9) is a data signal or a modulated or unmodulated microwave signal.

9. An optical communications network comprising at least one optical transmitter (1) and at least one optical receiver (3) interconnected by a fiber optic link (2), the optical transmitter (1) including means (5, 8) for modulating light in response to a modulating signal (9), and the optical receiver (3) including a photodiode (5) and an electronic filter (6), characterized in that the transmitter (1) further includes a laser diode (4) followed by a modulator (5) which generates a continuous-wave signal ($P_{cw}$) and a pulse modulated signal component ($P_m$) for transmission on said link as two miscible spatially coherent light signals having a same polarization, and that the receiver (3) further includes an evaluating circuit (6) for evaluating a signal resulting from a mixing of the continuous-wave signal ($P_{cw}$) and the pulse modulated signal component ($P_m$) for recovering one or more pulses of said pulse modulated signal.

10. An optical communications network as claimed in claim 9, characterized in that in the optical receiver (3), at least one correlation filter (6) and a subsequent decision circuit (7) evaluate the signal resulting from the mixing.

11. An optical communications network as claimed in claim 9, characterized in that in the transmitter (1), data used in said modulating signal is QAM-coded information.

12. An optical communications network as claimed in claim 9, characterized in that in the transmitter (1), data used in said modulating signal is for modulating according to a multilevel signaling scheme.

13. An optical communications network as claimed in claim 9, characterized in that the modulating signal (9) is a data signal or a modulated or unmodulated microwave signal.

* * * * *